Oct. 4, 1966 W. K. ALLEN 3,277,373

SERRODYNE FREQUENCY CONVERTER RE-ENTRANT AMPLIFIER SYSTEM

Filed Dec. 17, 1963 2 Sheets-Sheet 1

INVENTOR.
WALTER K. ALLEN

BY

ATTORNEYS

SERRODYNE FREQUENCY CONVERTER RE-ENTRANT AMPLIFIER SYSTEM

Filed Dec. 17, 1963 2 Sheets-Sheet 2

INVENTOR
WALTER K. ALLEN

United States Patent Office 3,277,373
Patented Oct. 4, 1966

3,277,373
SERRODYNE FREQUENCY CONVERTER RE-ENTRANT AMPLIFIER SYSTEM

Walter K. Allen, Silver Spring, Md., assignor to the United States of America as represented by the Administrator of the National Aeronautics and Space Administration Filed Dec. 17, 1963, Ser. No. 331,323
9 Claims. (Cl. 325—4)

The invention described herein may be manufactured and used by or for the Government of the United States of America for governmental purposes without the payment of any royalties thereon or therefor.

The present invention relates to a traveling wave tube re-entrant amplifier, and more particularly, to a traveling wave tube re-entrant amplifier which both amplifies a microwave frequency signal applied thereto and shifts the frequency thereof.

It is essential in many communication systems, that as the signals become weak during their transmission, they be amplied to retain any semblance to intelligence. This amplification is generally accomplished by an active repeater which receives a transmitted microwave carrier frequency signal, amplifies it, converts it to another microwave frequency and finally re-transmits it. The repeater converts the frequency of the microwave carrier frequency signal to another microwave frequency value to prevent feedback from the output to the input thereof which would cause spurious oscillations in the system.

In a communication system utilizing earth orbiting satellites the transmittal signals are greatly attenuated between the initiating earth station and the receiving earth station due to the great distances between the major elements of the system. This is especially true for synchronous communication satellites wherein the satellites use a 24-hour altitude orbit (approximately 22,000 miles) as the communication relay point. The need of an active repeater in such systems is, therefore, necessary for effective operation. In fact, depending upon the use being made of the communication satellite a number of such repeaters could be desired for each satellite, one being need for each carrier frequency channel.

The prior art active repeaters used in communication satellite application and the like, generally, have not been able to directly convert a received microwave carrier signal to another microwave frequency for re-transmission. Instead, the received microwave carrier frequency signal had to be first reduced to an intermediate frequency (IF) signal for amplification purposes and then be re-converted to another microwave frequency before it could be re-transmitted. Accordingly, their circuitries were quite complex and included at least a pre-selector, separate mixers, a local oscillator, amplifiers and filters. It can readily be seen that the elimination of one or more of these components would be a factor in reducing the overall weight of the repeaters. This would have a particular advantage in communication satellites which could use a number of repeaters and wherein weight requirements are at a premium.

The present invention as will be described hereinafter has the advantage of achieving, simultaneously, both direct frequency conversion (behaves as a conversion transducer) and amplification of a microwave frequency signal through the use of an inexpensive simple circuit requiring the minimum of components. In addition, due to the fact that fewer filters and no separate radio frequency (RF) mixers are required, it will have the added advantage of having lower losses than prior art circuits.

The above and other advantages are attained by the instant invention by the utilization of a traveling wave tube (TWT) in a re-entrant, serrodyne mode to serve as a major component of an active repeater to effect double amplification and frequency shift of an input microwave frequency signal. In more detail, the microwave frequency input signal at frequency $F_0$ is coupled by an $F_0$ band-pass filter to the TWT wherein frequency translation by a sawtooth transit time modulation of the signal takes place. This is accomplished by applying a sawtooth deviation signal $\Delta f$ to the helix of the TWT. The frequency converted microwave frequency signal output from the TWT is connected to two band-pass filters tuned to frequency $F_1$, where $F_1$ equals $(F_0+\Delta f)$, and $F_2$ where $F_2$ equals $(F_1+\Delta f)$, respectively. The output of the $F_1$ band-pass filter is coupled back to the input of the TWT. When the sawtooth deviation signal has a positive slope the output from the TWT comprises signals of frequencies $(F_0+\Delta f)$ and $(F_1+\Delta f)$ which are coupled to and passed by the band-pass filters tuned to frequencies $F_1$ and $F_2$, respectively. Accordingly, neglecting losses, it can readily be seen that the output signal derived from the $F_2$ band-pass filter is amplified twice and frequency shifted.

The exact nature of this invention as well as other objects and advantages thereof, will be readily apparent from consideration of the following specification relating to the annexed drawing in which.

Figure 2:
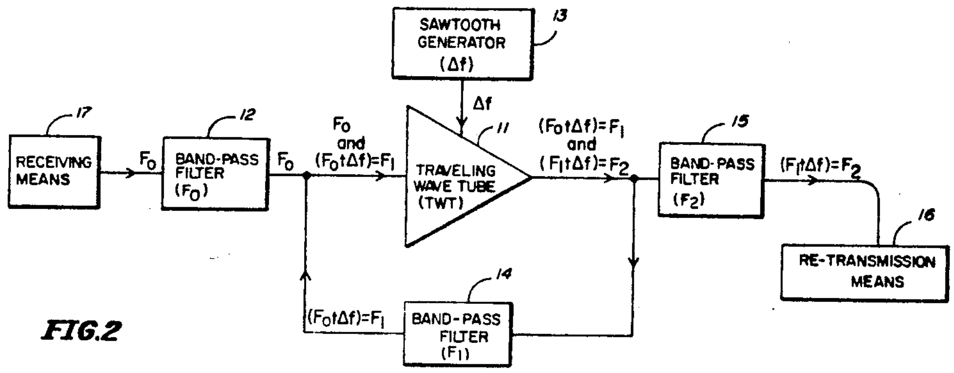
FIGURE 2 is a block diagram of the preferred embodiment of the invention.
Figure 4A:
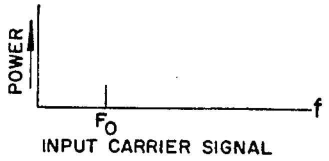
Figure 5A:
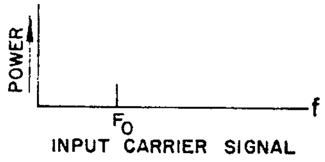
Figure 4B:
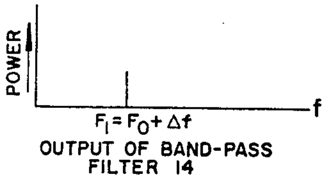
Figure 5B:
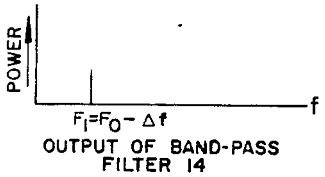
Figure 4C:
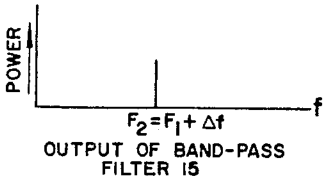
Figure 5C:
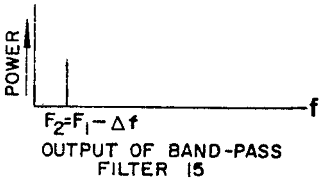

FIGURES 4*a*, 4*b* and 4*c* represent plots of power versus frequency of signals from the various band-pass filters of FIGURE 2 when a positive sloping sawtooth modulating signal is applied to the traveling wave tube thereof; and FIGURES 5*a*, 5*b* and 5*c* represent plots of power versus frequency of signals from the various band-pass filters of FIGURE 2 when a negative sloping sawtooth modulating signal is applied to the traveling wave tube thereof.

Figure 1:
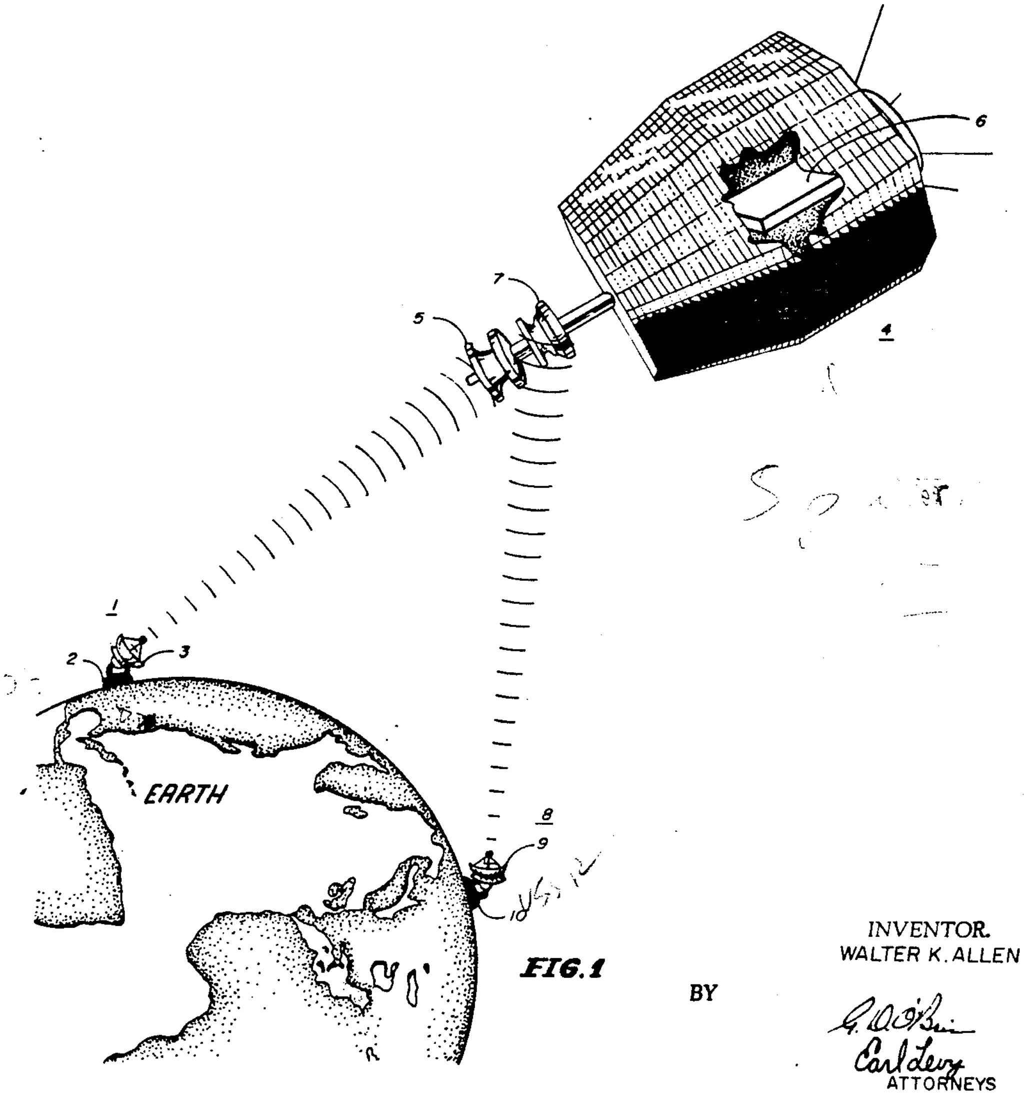
FIGURE 1 shows the invention used in conjunction with an active communication satellite system.

Referring now to the drawings, there is shown in FIGURE 1, associated with the earth, an active communication satellite system having an earth transmitting station 1 including a transmitter 2 connected to a transmitting antenna 3, the transmitting antenna being used for radiating various microwave carrier frequency signals. An active repeater satellite 4, having a receiving antenna 5 for receiving the microwave carrier frequency signals from transmitting station 2, also includes traveling wave tube frequency converting re-entrant amplifier circuits 6 (of the type that will be described hereinafter as the instant invention) as a portion thereof and a transmitting antenna 7. Transmitting antenna 7 re-radiates, at other microwave frequencies, the received microwave carrier frequency signals; and each of the traveling wave tube frequency converting re-entrant amplifier circuits 6 acts to both amplify one received microwave carrier frequency signal and convert it to another microwave carrier frequency signal which, in turn, will be re-radiated by antenna 7. Another station, earth receiving station 8, has a receiving antenna 9 and a receiver 10, antenna 9 being used for receiving the re-radiated carrier frequency signals from transmitting antenna 7.

Referring now more particularly to the instant invention, there is shown in FIGURE 2, in block form, traveling wave tube frequency converting re-entrant amplifier circuit 6 of FIGURE 1 including a traveling wave tube (TWT) 11 having connected to its input a band-pass filter 12 tuned to frequency $F_0$ and having connected to its output a band-pass filter 15 tuned to frequency $F_2$. Coupled across traveling wave tube 11 and acting as a feed-back circuit therefor is a band-pass filter 14 tuned to frequency $F_1$. This filter cooperates with the traveling wave tube so that the two together function as a re-entrant amplifier, i.e., the filter permits a signal to be fed back to the input of the traveling wave tube so that it can be amplified twice.

Figure 3:
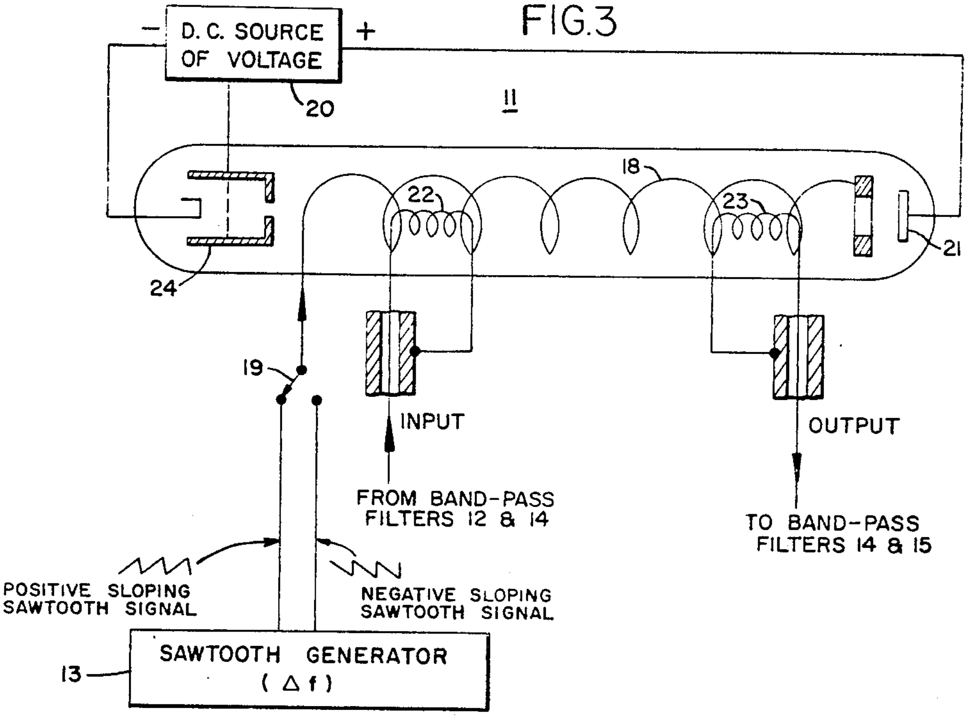
FIGURE 3 is a more detailed showing of the traveling wave tube portion of FIGURE 2.

Also connected to traveling wave tube 11, for example, to helix 18 thereof, as is shown in FIGURE 3, is a sawtooth generator 13 which applies a positive sloping sawtooth signal at frequency $\Delta f$ to traveling wave tube 11. By this connection, the serrodyne characteristics of the traveling wave tube is utilized and frequency displacement of the amplified signal occurs. An example of how the various signals can be applied to the traveling wave tube and a description of the serrodyning modulation technique can be found in Patent No. 2,927,280 to Raymond C. Cumming, March 1, 1960, and also in an article entitled, "The Serrodyne Frequency Translator" by Raymond C. Cumming, in Procedures of the IRE, February 1957, on pages 175–186.

Serrodyning is effectively single sideband, suppressed carrier modulation in which the sideband is determined by the adjustment of the amplitude and frequency of the sawtooth deviation signal. By such a modulation technique most of the input microwave carrier frequency energy is converted into one specific sideband signal, the sideband being at a frequency above that of the input microwave carrier frequency (modulated) signal should the slope of the sawtooth deviation (modulating) signal decrease the relative transit time of the amplifying device, and conversely, being at a frequency below that of the input microwave carrier frequency (modulated) signal should the slope of the deviation (modulating) signal increase the relative transit time of the amplifying device. In general terms, if the sawtooth signal deviates the phase of the microwave frequency signal being modulated by $2N\pi$ radians, then the particular sideband signal being produced would be displaced by N times the fundamental frequency of the sawtooth signal.

In FIGURE 3, traveling wave tube 11 is shown, for example, as comprising electron gun 24 and collector electrode 21 connected to a D.C. source of voltage 20; helix 18 connected through a switching means 19 to sawtooth generator 13; radio frequency (R.F.) input coupler 22 connected to receive signals from band-pass filters 12 and 14; and radio frequency (R.F.) output coupler 23 connected to apply an output signal to band-pass filters 14 and 15. Switching means 19 is provided so that sawtooth generator 13 is capable of furnishing either a positive or negative sloping sawtooth signal to helix 18. In a similar manner, while not shown, a switching means can be used in FIGURE 2 so that either a positive sloping or negative sloping sawtooth signal can be applied from sawtooth generator 13 to traveling wave tube 11.

When the instant invention is included as part of active repeater satellite 4 of FIGURE 1, a receiving means 17, including, for example, antenna 5 of active repeater satellite 4 and a pre-amplifier (not shown), picks up the microwave carrier frequency signal radiated from antenna 3 of earth transmitting station 1 and applies it to band-pass filter 12. A retransmission means 16, such as a power amplifier (not shown) and antenna 7 of active repeater satellite 4, is coupled to band-pass filter 15 to receive the output therefrom and re-transmit it to antenna 9 of earth receiving station 8, the re-transmitted signal output from re-transmission means 16 having been both amplified and converted to another microwave carrier frequency in a manner that will hereinafter be described.

In operation, a signal at frequency $F_0$, from receiving means 17, is passed by band-pass filter 12 to input coupler 22 of traveling wave tube 11, as shown in FIGURE 3. At the same time a positive sloping sawtooth deviation signal $\Delta f$ is applied from sawtooth generator 13, via switching means 19, to helix 18 of traveling wave tube 11. In addition to the amplification of the input signal by its normal operation, traveling wave tube 11, due to the utilization of the serrodyne characteristics thereof, behaves as a conversion transducer to shift the frequency of the input signal from $F_0$ so that the output therefrom is at frequency $(F_0+\Delta f)=F_1$. In actuality, the input signal is modulated by the positive sloping sawtooth signal from sawtooth generator 13 to form a modulation product signal. This modulation product output signal is at the upper sideband frequency because the positive sloping sawtooth signal applied to the helix 18 of TWT 11 causes the transit velocity of the microwave frequency signal to increase.

The output signal from traveling wave tube 11, obtained from output coupler 23 at frequency $F_1$, is then fed back by band-pass filter 14 to input coupler 22 of traveling wave tube 11, and applied thereto, in addition to the signal at frequency $F_0$. Accordingly, the input of traveling wave tube 11 now comprises a signal at frequency $F_0$ and a signal at frequency $F_1=(F_0+\Delta f)$. Again, utilizing the serrodyne characteristics of the TWT, the sawtooth deviation signal $\Delta f$ converts the input signals at frequencies $F_0$ and $F_1$ to signals at frequencies $$(F_0+\Delta f)=F_1 \text{ and } (F_1+\Delta f)=F_2$$

respectively. In addition to this frequency conversion of the input signals, the TWT also provides amplification thereof. Accordingly, the signal at frequency $(F_1+\Delta f)$ has in essence been amplified twice.

The amplified, frequency converted signals from the output coupler 23 of TWT 11 are coupled to band-pass filters 14 and 15. Band-pass filter 14 feeds back the signal at frequency $(F_0+\Delta f)=F_1$ to input coupler 22 of traveling wave tube 11, and band-pass filter 15 passes the signal at frequency $(F_1+\Delta f)=F_2$ to re-transmission means 16.

FIGURES 4*a*, 4*b* and 4*c* are presented to show the plots of power versus frequency of the signals from the various band-pass filters of the circuit of FIGURE 2 when the circuit operates with a positive sloping sawtooth modulating signal being applied to traveling wave tube 11, as just described. Particularly, FIGURES 4*a*, 4*b* and 4*c* represent plots of power versus frequency of the output signals from band-pass filters 12, 14 and 15, respectively.

While the invention has been described with the sawtooth deviation signal having a positive slope and being applied to the helix of the TWT, it can have a negative slope and be applied equally as well to other elements of the TWT as long as the serrodyne characteristics can be attained. If the sawtooth signal has a negative slope then the output signal from the TWT will be at the lower sideband of the carrier instead of the upper and $F_1'$ will be $(F_0-\Delta f)$ and $F_2'$ will be $(F_1'-\Delta f)$.

FIGURES 5*a*, 5*b* and 5*c* are presented to illustrate the plots of power versus frequency of the signals from the various band-pass filters of the circuit of FIGURE 2 in the instance when a negative sloping sawtooth modulating signal is applied to traveling wave tube 11. Particularly, FIGURES 5*a*, 5*b* and 5*c* represent plots of power versus frequency of the output signals from band-pass filter 12, 14 and 15, respectively.

It can also be considered to be within the teaching of this invention to utilize, in place of the TWT, other microwave tubes that exhibit serrodyne characteristics.

The foregoing disclosure relates to a preferred embodiment of the invention. Numerous modifications or alterations may be made therein without departing from the spirit and scope of the invention set forth in the appended claims.

What is claimed is:

1. A device for amplifying and frequency converting a carrier input signal comprising: a transit-time conversion transducer-amplifier means having an input and an output; coupling means connected to said input of said transit-time conversion transducer-amplifier means for applying said carrier input signal thereto so that it can be amplified therein; modulating means connected to said transit-time conversion transducer-amplifier means for applying a sawtooth modulating signal to said transit-time conversion transducer-amplifier means so that said modulating signal coacts with said carrier input signal to form a modulation product signal at said output of said transit-time conversion transducer-amplifier means; frequency selective means coupled between said input and said output of said transit-time conversion transducer-amplifier means for circulating a signal of a selective frequency of said modulation product signal from said output of said transit-time conversion transducer-amplifier means to said input of said transit-time conversion transducer-amplifier means; and another frequency selective means connected to said output of said transit-time conversion transducer-amplifier means for passing a selective output frequency signal at a frequency different from said aforementioned selective frequency of said modulation product signal, whereby said selected output frequency signal from said other frequency selective means is doubly amplified and shifted in frequency from that of said carrier input signal.

2. The device of claim 1, wherein said transit-time conversion transducer-amplifier means is a traveling wave tube.

3. The device of claim 1, wherein said carrier input signal is at frequency $F_0$, said sawtooth modulating signal is positive sloping and at a frequency $\Delta f$, said frequency selective means is tuned to pass a signal at frequency $F_1=F_0+\Delta f$, and said other frequency selective means is tuned to pass a signal at frequency $F_2=F_1+\Delta f$.

4. The device of claim 1, wherein said carrier input signal is at frequency $F_0$, said sawtooth modulating signal is negative sloping and at a frequency $\Delta f$, said frequency selective means is tuned to pass a signal at frequency $F_1'=F_0-\Delta f$, and said other frequency selective means is tuned to pass a signal at frequency $F_2'=F_1'-\Delta f$.

5. A device for amplifying and frequency converting a carrier input signal comprising: transit-time conversion transducer-amplifier means; first frequency selective means coupling said carrier input signal to said transit-time conversion transducer-amplifier means so that it can be amplified therein; means connected to said transit-time conversion transducer-amplifier means for applying a sawtooth modulating signal thereto for producing a frequency shift of the carrier input signal amplified therein; second frequency selective means tuned to pass said frequency shifted carrier input signal and coupled to said transit-time conversion transducer-amplifier to circulate said frequency shifted carrier input signal between the output and input thereof, said circulated frequency shifted carrier input signal being amplified a second time by said transit-time conversion transducer-amplifier means and being shifted in frequency a second time by being modulated by said sawtooth modulating signal in said transit-time conversion transducer-amplifier means, and third frequency selective means connected to the output of said transit-time conversion transducer-amplifier means and tuned to pass the twice frequency shifted carrier input signal from said transit-time conversion transducer-amplifier means, whereby the output signal from said third frequency selective means is doublly ampified and shifted in frequency twice.

6. A device for amplifying and frequency converting an input signal, said device comprising: a transit-time reentrant amplifying means for amplifying said input signal and including a transit-time microwave amplifying tube having an output and an input and a frequency selective filter connected between said output and said input of said transit-time microwave amplifying tube; means connected to said transit-time re-entrant amplifying means for applying said input signal to said input of said transit-time microwave amplifying tube thereof; and a sawtooth signal generating means connected to said re-entrant amplifying means for applying a sawtooth signal thereto, said sawtooth signal to coact with said input signal in said transit-time microwave amplifying tube to accomplish serrodyning and form a modulation product signal; said frequency selective filter acting to circulate a signal, at a selective frequency of said modulation product signal, from the output to the input of said transit-time microwave amplifying tube, whereby said input signal after being amplified twice by said transit-time re-entrant amplifying means and shifted in frequency twice by the action of said sawtooth signal with said input signal is removed from said output of said transit-time microwave amplifying tube.

7. The device of claim 6, wherein said transit-time microwave amplifying tube is a traveling wave tube and which further includes another frequency selective filter connected to the said output of said traveling wave tube and tuned so that said input signal that has been shifted in frequency a second time can be passed therethrough.

8. A device for amplifying and frequency converting a carrier input signal comprising: a traveling wave tube having an input, an output and a slow wave structure in the form of a helix, said traveling wave tube amplifying said carrier input signal; a sawtooth generator connected to and applying a sawtooth modulating signal to said helix of said traveling wave tube, said sawtooth modulating signal coacting with said carrier input signal to produce at said output of said traveling wave tube a signal which is a modulation product signal; a filter tuned to pass said modulation product signal and connected between said input and said output of said traveling wave tube to circulate said modulation product signal therebetween for re-amplification and re-modulation thereof, said re-modulation producing a signal which is a modulation product of said aforementioned modulation product signal; and another filter connected to said output of said traveling wave tube and tuned to pass said latter mentioned modulation product signal.

9. A satellite communication system comprising: an initial station for transmitting a signal at one frequency; an orbiting satellite repeater having means for receiving said signal at said one frequency, transit-time conversion transducer-amplifier means, first frequency selective means tuned to said one frequency for passing said signal at said one frequency from said receiving means to the input of said transit-time conversion transducer-amplifier means, means connected to said transit-time conversion transducer-amplifier means for applying a sawtooth modulating signal thereto for shifting the frequency of said signal at said one frequency to a second frequency, second frequency selective means tuned to said second frequency and connected across said transit-time conversion transducer-amplifier means for circulating the signal at said second frequency from the output of said transit-time conversion transducer-amplifier means to the input thereof, said sawtooth modulating signal shifting the frequency of said circulated signal to a third frequency, re-transmitting means, third frequency selective means connected between the output of said transit-time conversion transducer-amplifier means and the input of said re-transmitting means and tuned to said third frequency for passing the signal at said third frequency to said re-transmitting means; and a terminal station for receiving said third frequency signal from said re-transmitting means.

References Cited by the Examiner

UNITED STATES PATENTS

| | | | |
|---|---|---|---|
| 2,619,543 | 11/1952 | Cutler | 330—43 |
| 2,770,722 | 11/1956 | Arams | 325—11 |
| 3,048,794 | 8/1962 | Ares | 330—43 |

OTHER REFERENCES

Cumming, R. C.: "The Serrodyne Frequency Translator"; Proceedings of the IRE; February 1957; pages 175–186.

DAVID G. REDINBAUGH, *Primary Examiner.*

B. V. SAFOUREK, *Assistant Examiner.*